United States Patent
Cregut et al.

(10) Patent No.: US 9,160,268 B2
(45) Date of Patent: Oct. 13, 2015

(54) SYSTEM FOR CONTROLLING A VOLTAGE INVERTER SUPPLYING POWER TO A MULTIPHASE ELECTRICAL MOTOR OF A MOTOR VEHICLE

(75) Inventors: Samuel Cregut, Saint-Remy-les-Chevreuse (FR); Marco Marsilia, Boulogne Billancourt (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 90 days.

(21) Appl. No.: 13/977,459

(22) PCT Filed: Nov. 23, 2011

(86) PCT No.: PCT/EP2011/070785
§ 371 (c)(1),
(2), (4) Date: Jan. 31, 2014

(87) PCT Pub. No.: WO2012/089426
PCT Pub. Date: Jul. 5, 2012

(65) Prior Publication Data
US 2014/0132188 A1 May 15, 2014

(30) Foreign Application Priority Data
Dec. 28, 2010 (FR) ...................................... 10 61315

(51) Int. Cl.
*H02P 21/00* (2006.01)
*H02P 21/14* (2006.01)
(Continued)

(52) U.S. Cl.
CPC ........... *H02P 21/14* (2013.01); *H02M 7/53873* (2013.01); *H02M 7/53875* (2013.01); *H02P 27/08* (2013.01); *H02M 2001/0048* (2013.01); *Y02B 70/1491* (2013.01)

(58) Field of Classification Search
CPC ............................... H02P 27/08; H02P 27/085
USPC ..................................................... 318/400.02
See application file for complete search history.

(56) References Cited

U.S. PATENT DOCUMENTS

2004/0232875 A1    11/2004  Youm
2009/0146590 A1*    6/2009  Hamasaki ................ 318/400.02
(Continued)

FOREIGN PATENT DOCUMENTS

EP         0 128 796       12/1984

OTHER PUBLICATIONS

Lai, Yen-Shin, et al., "Novel Pulse-width Modulation Technique with Loss Reduction for Small Power Brushless DC Motor Drives", Conference Record of the 2002 IEEE Industry Applications Conference: 37th IAS Annual Meeting, vol. 3, pp. 2057 to 2064, (Oct. 13-18, 2002), XP 010610160.

(Continued)

*Primary Examiner* — Erick Glass
(74) *Attorney, Agent, or Firm* — Oblon, McClelland, Maier & Neustadt, L.L.P.

(57) ABSTRACT

A system for controlling a voltage inverter, or supplying power to a multiphase electric motor of an automobile vehicle, including: a mechanism generating values of power supply voltages for each phase of the electric motor, together with an amplitude value of the power supply voltages; a phase-splicing determination mechanism; and a controller controlling the phase splicing cooperating to control transmission to the voltage inverter of duty cycles generated by determining the duty cycles, as a function of values of power supply voltages for each phase of the electric motor, and also of the amplitude value of the power supply voltages.

9 Claims, 4 Drawing Sheets

(51) Int. Cl.
*H02M 7/5387* (2007.01)
*H02P 27/08* (2006.01)
*H02M 1/00* (2007.01)

(56) References Cited

U.S. PATENT DOCUMENTS

2010/0079192 A1  4/2010  Strzalkowski
2010/0117574 A1*  5/2010  Gunji ........................ 318/400.14
2011/0133678 A1*  6/2011  Tomigashi ............... 318/400.04
2012/0176071 A1*  7/2012  Manabe ................... 318/400.14

OTHER PUBLICATIONS

International Search Report Issued Apr. 18, 2012 in PCT/EP11/70785 Filed Nov. 23, 2011.

* cited by examiner

SYSTEM FOR CONTROLLING A VOLTAGE INVERTER SUPPLYING POWER TO A MULTIPHASE ELECTRICAL MOTOR OF A MOTOR VEHICLE

BACKGROUND

The invention relates to the technical field of the control of multiphase electric motors for automobile vehicles.

The traction machines of electric vehicles are electrically powered by transistor systems designed to generate single-phase alternating voltages from a DC voltage. This power electronic system is called a voltage inverter. The control of the switches included in the voltage inverter is carried out by signals modulated in pulse width (PWM for pulse-width modulation). Pulse-width modulation consists in generating a train of pulses at a fixed frequency and with variable width, whose average value corresponds to the value of the setpoint applied.

Various methods exist that are conventionally used to obtain such a modulation.

The sinusoidal method allows a PWM modulation with a zero or very low voltage to be supplied.

The injection of a third-order harmonic allows the amplitude of the main harmonic to be increased. This method has been developed principally for increasing the linear voltage region. It does however have the drawback of increasing the rms value of the current and hence the losses, both in the power electronics and in the motor.

Space Vector Modulation has been developed in order to increase the linear voltage region, while at the same time avoiding the increase in current caused by the harmonic injection.

Discontinuous methods allow the switching losses to be minimized in the transistors while at the same time conserving a good use of the voltage available and a limitation of the current. Their main drawback is being difficult to implement and not easily compatible with the real duty cycle limits. The reason for this is that, owing to the dispersion in switching times of the transistors, a voltage inverter must comprise a dead time in order to limit the duty cycle values.

The document US 2009/0179608 describes a method for controlling a voltage inverter supplying power to an electric motor of an automobile vehicle. The method described takes into account constraints on forbidden regions of the duty cycles in the case of a chopping frequency that can be variable. This method is of the space vector modulation type.

BRIEF SUMMARY

One subject of the invention is a control system designed to minimize the switching losses in the transistors of the voltage inverter while at the same time conserving a good use of the voltage available and a limitation of the current and without imposing a dead time on the voltage inverter.

In one embodiment, a control system is provided for a voltage inverter, notably for supplying power to a multiphase electric motor of an automobile vehicle. The control system comprises a means for generating values of power supply voltages for each phase of the electric motor, together with an amplitude value of the power supply voltages.

The control system furthermore comprises a phase-splicing determination means and a means for controlling the phase splicing cooperating in order to control the transmission to the voltage inverter of duty cycles generated by means for determining the duty cycles, as a function of the values of power supply voltages for each phase of the electric motor, and also of the amplitude value of the power supply voltages.

Here, "phase splicing" is understood to mean the absence of switching on one arm of the inverter for a period equal to the chopping period; thus, during this period, a holding at 1 is implemented when the top switch of the arm remains closed, and the bottom switch of the arm remains open; the potential of the phase is fixed to the high-potential point of the DC bus. In a symmetrical fashion, a holding at 0 is implemented when the bottom switch of the arm remains closed, and the top switch of the arm remains open during the whole chopping period; the potential of the phase is fixed to the low-potential point of the DC bus.

The control system has the advantage of reducing the switching losses by a ratio of two thirds.

The phase-splicing determination means can comprise phase detection means each being designed to generate a phase voltage signal, the phase-splicing determination means being furthermore designed to generate a phase identification signal at its output equal to that of the phase voltage signals whose value is non-zero.

The control system is thus easier to implement thanks to a modular design.

The means for controlling the phase splicing may be designed to generate a signal for enabling the phase splicing depending on the comparison of the amplitude value of the power supply voltages with a splicing enabling threshold and with a splicing disabling threshold.

The operation of the control system is thus optimized through the choice of the enabling and disabling thresholds. The thresholds are determined as according to the characteristics of the electronics such as for example the precision and the quantization of the analog-digital or digital-analog converters.

The control system can comprise switches designed to control the transmission of a signal from amongst the duty cycle signals received from the means for determining the duty cycles for each phase depending on the signals received from the phase-splicing determination means and from the means for controlling the phase splicing.

The means for determining the duty cycles for each phase can comprise at least one means for holding at the zero potential, designed to cancel the duty cycle of a phase by addition of a constant shift and by shifting the duty cycles of the other phases by the same constant.

The means for determining the duty cycles for each phase can comprise at least one means for holding at the DC potential designed to fix the duty cycle of a phase at the value one by addition of a constant shift and by shifting the duty cycles of the other phases by the same constant.

The means for determining the duty cycles for each phase can comprise at least one scalar control means designed to shift all the duty cycles by addition of the same constant.

These shifts are applied by simple addition or subtraction of a constant to or from each of the duty cycles, which has the effect of fixing one of the three duty cycles at the value 0 or one of the three duty cycles at the value 1. In the case where none of the duty cycle values is fixed at 0 or at 1, the constant shift is chosen in order to obtain duty cycles between 0 and 1.

The means for determining the duty cycles for each phase can comprise as many means for holding at the zero potential and means for holding at the DC potential as there are phases of the multiphase electric motor.

The invention also relates to a method for controlling a voltage inverter, notably for supplying power to a multiphase electric motor of an automobile vehicle, comprising a step for generating values of power supply voltages for each phase of the electric motor, together with an amplitude value of the power supply voltages. The control method comprises steps during which duty cycles are determined that are generated according to the values of power supply voltages for each phase of the electric motor, and also to the amplitude value of the power supply voltages, a phase splicing is determined, and a phase splicing command is generated in order to control the transmission of the duty cycles to the voltage inverter.

BRIEF DESCRIPTION OF THE DRAWINGS

Other aims, features and advantages will become apparent upon reading the following description presented solely by way of non-limiting example and with reference to the appended drawings, in which.

DETAILED DESCRIPTION

Figure 1:
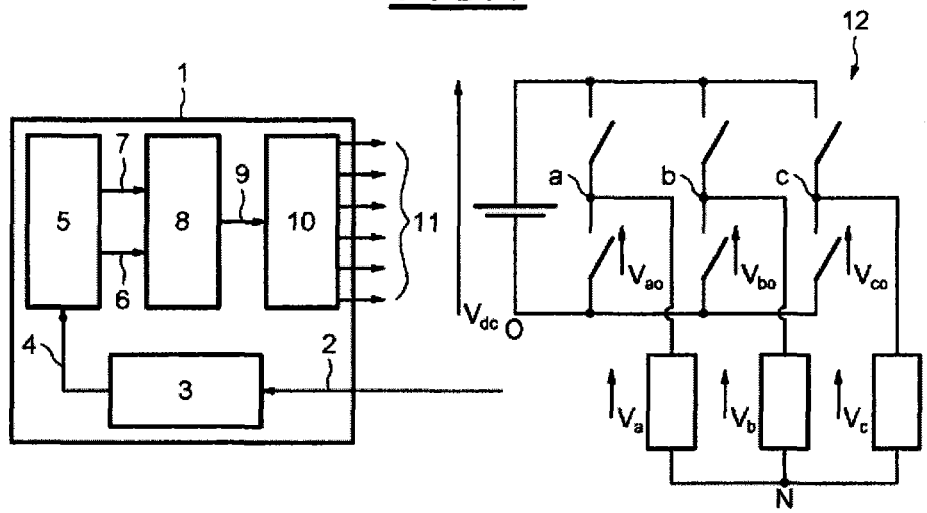
FIG. 1 illustrates the main elements of a means for controlling a voltage inverter and the corresponding voltage inverter.

FIG. 1 shows a voltage inverter 12 controlled by a control means 1. The control means 1 comprises a measurement means 3 connected to sensors via the connection 2. The measurement means 3 is designed to determine the physical operating parameters of the motor such as the power supply current of the phases of the motor and the angle between the phases.

The measurement means 3 communicate these values to a means for controlling the currents 5 via the connection 4. The means for controlling the currents 5 determines new voltage setpoints as a function of the measurements received.

These voltage setpoints are denoted (Van, Vbn, Vcn) in the following part of the document. These new setpoints comprise the power supply voltages for each phase of the motor as reduced values denoted (Va, Vb, Vc) together with the amplitude of these voltages, denoted Mod_Vdq. A means for calculating the duty cycles 8 receives the power supply voltages for each phase via the connection 7 and the amplitude of the voltage Mod_Vdq via the connection 6. The means for calculating the duty cycles 8 sends the duty cycles RCa, RCb and RCc for each phase of the motor via the connection 9 to a means 10 for generating the pulse-width modulated signals. The generation means 10 sends pulse-width modulated signals to the inverter depending on the duty cycles received.

The voltages (Vao, Vbo, Vco) at the output of the inverter are connected to the duty cycles (RCa, RCb, RCc) applied to each arm (a,b,c) and to the voltage of the DC bus Vdc supplying the inverter, by the following equations:

$Vao=RCa*Vdc$ $Vbo=RCb*Vdc$ $Vco=RCc*Vdc$

Henceforth, the reduced values will be used:

$Va=Van/Vdc$ $Vb=Vbn/Vdc$ $Vc=Vcn/Vdc$

The three-dimensional vector containing the three signals {Va, Vb, Vc} is denoted Vabc. The three-dimensional vector containing the three signals {RCa, RCb, RCc} is denoted RCabc.

The norm of the vector sum of the three signals {Va,Vb, Vc} is denoted Mod_Vdq.

The signals Vabc and Mod_Vdq are sent by the means for closed-loop control 5 of the currents in the powered electrotechnical system. Conventionally, the powered system may be an electric motor or a static converter. The signals RCabc are sent to the electronic module 10 responsible for driving the power bridge of the voltage inverter by transforming the duty cycles into logic signals intended for each of the six switches of the power bridge.

Figure 2:
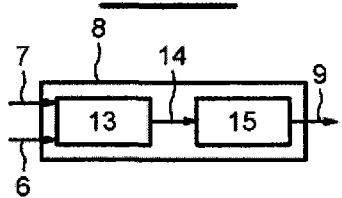
FIG. 2 illustrates the main elements of a means for calculating the duty cycles.

FIG. 2 shows the main elements of a means for calculating the duty cycles 8 such as a control system 13 and a filtering module 15. The control system 13 is connected at its input to the connections 7 and 6, and at its output to a filtering module 15 via the connection 14. The filtering module 15 is connected at its output to the connection 9.

The filtering module 15 allows the distortion due to the dead time and to the switching times to be taken into account. The filtering module 15 prohibits the values of duty cycles close to zero and to one. For this purpose, a parameter $\alpha_{min}$ is defined which defines the minimum duty cycle and, in a symmetrical manner, the maximum duty cycle $(1-\alpha_{min})$. The parameter $\alpha_{min}$ is fixed such that the period corresponding to the removed duty cycles (between 0 and $\alpha_{min}$) are equal to the switching time of the transistors of the voltage inverter. For example, for a chopping frequency of 20 kHz, an MOS transistor exhibits a switching time of 3 µs. A parameter $\alpha_{min}=0.1$ then corresponds to a minimum width of the ON signal of the transistor of 3.5 µs. By eliminating the duty cycles in the range between 0 and 0.1, the distortions due to the switching times are removed.

Figure 3:
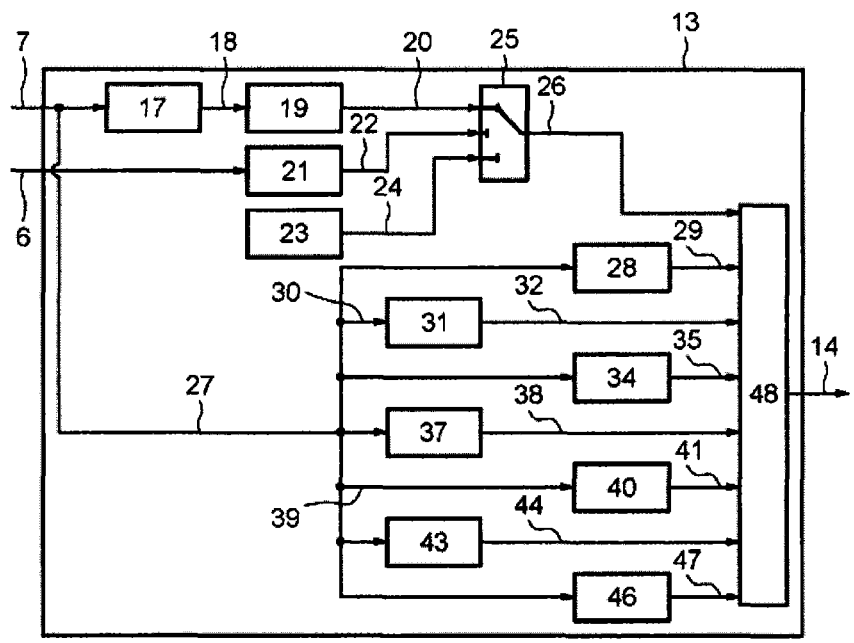
FIG. 3 illustrates the main elements of a control system for a voltage inverter.

FIG. 3 shows the main elements of a control system for a voltage inverter. Among these main elements, a digital filtering means 17 allows the noise that may exist on the signal Vabc received at the input to be suppressed. This can notably be a second-order low-pass filter with a passband of 500 Hz.

A phase-splicing determination means 19 is connected to the digital filtering means 17 via the connection 18. The phase-splicing determination means 19 allows a phase signal to be generated as a function of the filtered signal received from the digital filtering means 17. The phase signal is limited to discrete integer values varying from 1 to 6. The phase-splicing determination means 19 will be more fully described in the description of FIGS. 4 and 5.

The means for controlling the phase splicing 21 implements the enabling or the disabling of the splicing of the phases. The means for controlling the phase splicing 21 will be described in more detail in the description of FIG. 6.

A first switch 25 is connected by its first input to the phase-splicing determination means 19 via the connection 20, by its second input to a memory 23 comprising the value zero via a connection 24. The first switch 25 produces at its output the value received from the phase-splicing determination means 19 when the logic signal received from the means for controlling the phase splicing 21 is equal to one. Otherwise, the first switch produces at its output the value zero included in the memory 23. The signal at the output of the first switch 25 can therefore take the integer values in the range between zero and six.

The control system comprises means for determining the duty cycles (28, 31, 34, 37, 40, 43, 46) which allow the duty cycles to be calculated in various cases. One case corresponds to a zero scalar command. The other cases correspond to the phase splicing for the various values taken by the phase signal. These various means will be described hereinbelow in the course of the description of FIGS. 8, 9 and 10.

The means for determining the duty cycles (28, 31, 34, 37, 40, 43, 46) are respectively connected to a second switch 48 via connections (29, 32, 35, 38, 41, 44, 47). The second switch 48 is also connected by its control input to the first switch 25 via the connection 26. The second switch 48 produces at its output via the connection 14 one or the other of the values received from the means for determining the duty cycles (28, 31, 34, 37, 40, 43, 46) as a function of the value taken by the signal received from the first switch 25. The signal produced by the first switch 25 can take values in the range between zero and six.

Figure 4:
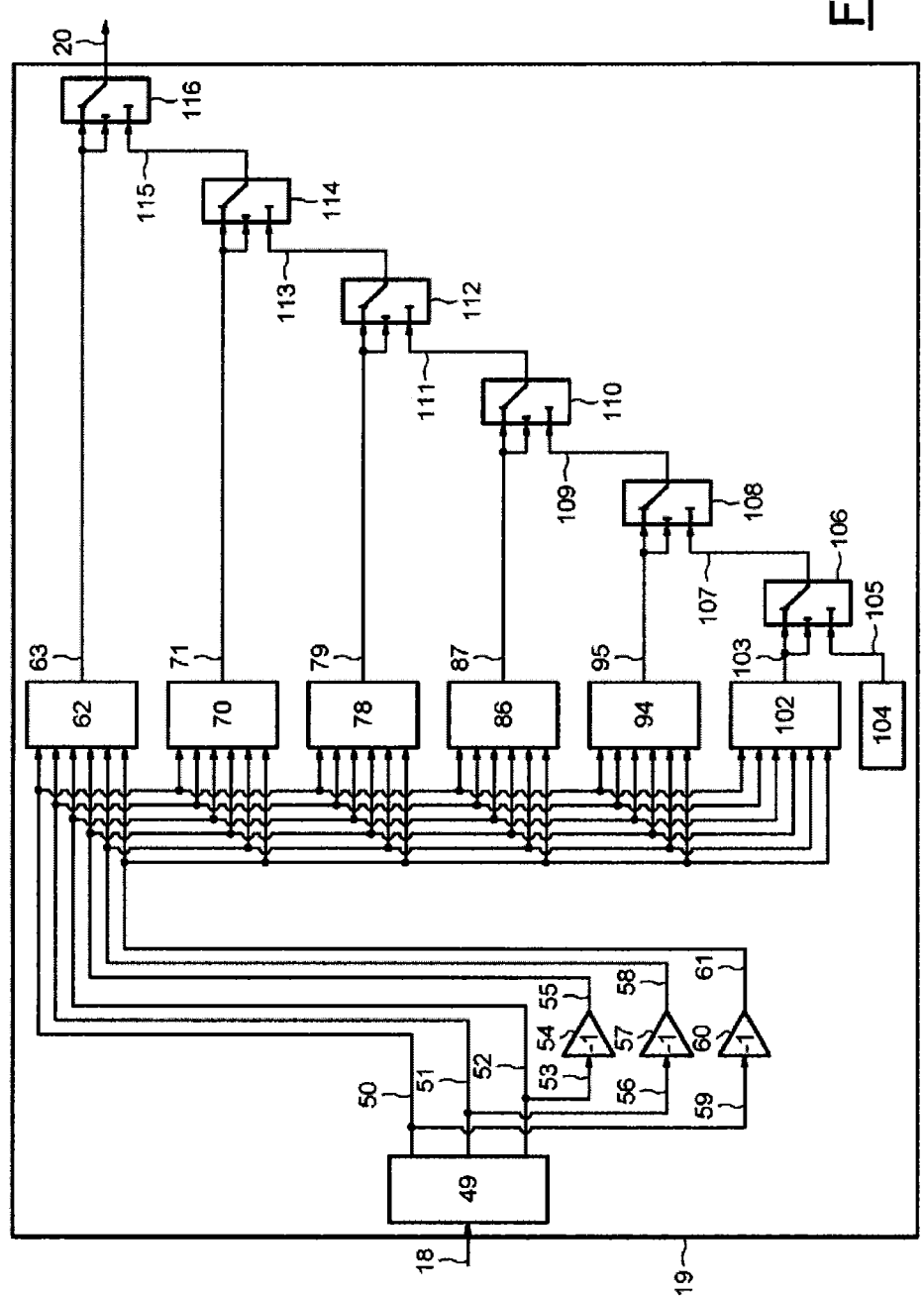
FIG. 4 illustrates a phase-splicing determination means.

The phase-splicing determination means 19, illustrated in FIG. 4, allows a discrete phase signal to be generated depending on the filtered values {Va, Vb, Vc} received from the digital filtering means 17. The filtered values {Va, Vb, Vc} may be received in a vector form or in a multiplexed form. It may then be necessary to carry out an extraction of scalar values or a de-multiplexing in order to obtain the values Va, Vb and Vc by a de-multiplexing means 49.

The values Va, Vb and Vc are sent to phase detection means (62, 70, 78, 86, 94, 102). Multipliers (54, 57, 60) are connected via branch lines (53, 56, 59) to each of the connections (50, 51, 52) carrying the values Va, Vb and Vc so as to generate opposing values −Va, −Vb and −Vb. The opposing values −Va, −Vb and −Vb are transmitted to the phase detection means (62, 70, 78, 86, 94, 102) via connections (55, 58, 61). Each phase detection means (62, 70, 78, 86, 94, 102) produces at its output a value corresponding either to an integer in the range between one and six or to the value zero.

Each phase detection means (62, 70, 78, 86, 94, 102) is connected at its output to a switch (116, 114, 112, 110, 108, 106). A switch comprises a first input, a second input and a control input which enables the choice of which of the two inputs is connected to the output.

A phase detection means (62, 70, 78, 86, 94, 102) is connected by its output to the first input and to the control input of the switch (106, 108, 110, 112, 114, 116) corresponding to it. The second input of the switch is connected to the output of the preceding switch. The output of the switch is connected to the second input of the following switch.

The n-th switch is connected to the (n−1)-th switch by its second input and to the (n+1)-th switch by its output. The second input of the third switch 106 is connected via the connection 105 to a memory 104 comprising the value zero. The output of the eighth switch 116 is connected to the output 20 of the phase-splicing determination means 19.

Thus, the third switch 106 produces at its output the value received from the phase detection means 102 if the value received is non-zero, otherwise the value zero included in the memory 104 is produced.

The fourth switch 108 produces at its output the value received from the phase detection means 94 if the value received is non-zero, otherwise the value received from the third switch 106 is produced. The fifth switch 110, sixth switch 112, seventh switch 114 and eighth switch 116 exhibit a behavior similar to that of the fourth switch 108.

Figure 5:
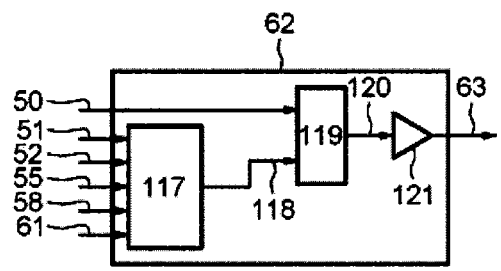
FIG. 5 illustrates the structure common to each of the phase detection means.

FIG. 5 illustrates the structure common to each of the phase detection means (62, 70, 78, 86, 94, 102). A phase detection means receives the values Va, Vb and Vc and the opposing values −Va, −Vb and −Vb at its input and produces a phase value at its output.

A phase detection means comprises a first comparator 117 receiving at its input five of the values received at the input, and producing at its output the maximum value from amongst the values received at the input. The output of the first comparator 117 is connected via a connection 118 to an input of a second comparator 119 furthermore receiving the sixth value received at the input of the phase detection means. The second comparator 119 produces at its output a value equal to unity if the sixth value is greater than the value coming from the first comparator 117, otherwise a zero value is produced. The value coming from the second comparator 119 is received by a multiplier 121 via the connection 120. The output of the multiplier 121 corresponds to the output 63 of the phase detection means.

The first phase detection means 62 receives the value Va as a sixth value and applies a gain equal to one during the processing of the signal by the multiplier 121.

The second phase detection means 70 receives the value Vb as a sixth value and applies a gain equal to two during the processing of the signal by the multiplier 121.

The third phase detection means 78 receives the value Vc as a sixth value and applies a gain equal to three during the processing of the signal by the multiplier 121.

The fourth phase detection means 86 receives the value −Va as a sixth value and applies a gain equal to four during the processing of the signal by the multiplier 121.

The fifth phase detection means 94 receives the value −Vb as a sixth value and applies a gain equal to five during the processing of the signal by the multiplier 121.

The sixth phase detection means 102 receives the value −Vc as a sixth value and applies a gain equal to six during the processing of the signal by the multiplier 121.

It can thus be seen that the value produced by each of the phase detection means (62, 70, 78, 86, 94, 102) corresponds to the integers in the range between one and six. These values are processed by the chain of switches described hereinabove with reference to FIG. 4. Within each comparator, if the value of the first input is non-zero, the first input is connected to the output, otherwise the second input is connected to the output. The phase value produced at the output of the phase-splicing determination means 19 corresponding to the output of the chain of switches can take an integer value in the range between zero and six, as has been described in the introduction.

Figure 6:
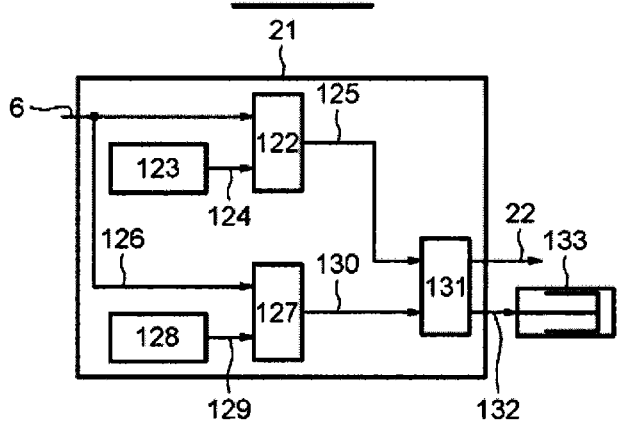
FIG. 6 illustrates the main elements of a means for controlling the phase splicing.

The means for controlling the phase splicing 21, illustrated by FIG. 6, receives the signal Mod_Vdq at its input corresponding to the amplitude of the three signals {Va, Vb, Vc}. The means for controlling the phase splicing 21 produces at its output the logic value Act_Col that can take a value zero or a value equal to unity.

A third comparator 122 included in the means for controlling the phase splicing 21 determines whether the value Mod_Vdq received at the input via a connection 6 is greater than or equal to a value of splicing enabling threshold included in a first memory 123 and received via a connection 124.

A fourth comparator 127 included in the means for controlling the phase splicing 21 determines whether the value Mod_Vdq received at its input via a branch line 126 of the connection 6 is strictly less than a value of splicing disabling threshold included in a second memory 128 and received via a connection 129.

The values for enabling the splicing and for disabling the splicing are chosen as a function of the amplitude Mod_Vdq. For example, the value 0.25 could be chosen as a value for enabling the splicing and the value 0.15 as a value for disabling the splicing.

An S-R flip-flop 131 receives at its input S (S for Set), via the connection 125, the value produced at the output of the third comparator 122. The S-R flip-flop 131 receives at its input R (R for Reset), via the connection 130, the value produced at the output of the fourth comparator 127.

The S-R flip-flop 131 comprises an output Q and an output !Q. The output Q is connected to the output 22 of the means for controlling the phase splicing 21. The output !Q is connected to a terminator 133 via the connection 132. The signal produced by the output Q can take a value zero or a value equal to unity depending on the values received at the inputs S and R. The output Q corresponds to the value Act_Col described hereinabove.

Figure 7:
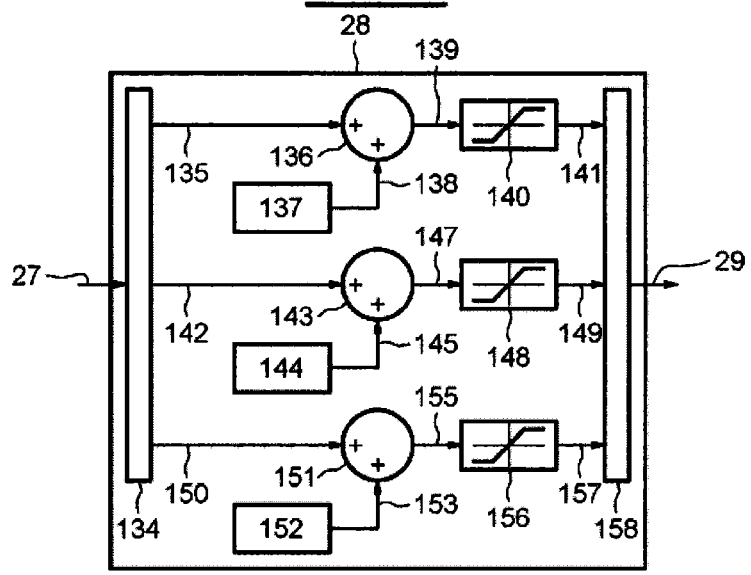
FIG. 7 illustrates the main elements of a scalar control means.

FIG. 7 illustrates a scalar control means 28 mentioned hereinabove with reference to FIG. 3. A scalar control means 28 receives at the input the value Vabc via the connection 27 and produces at its output the value RCabc via the connection 29. The value Vabc is transformed by a decomposition means 134 into three values Va, Vb and Vc by vector-scalar conversion or by de-multiplexing.

Decomposition means are understood to mean a means designed to transform a vector received at the input into one or more vectors with a dimension less than the vector received at the input and to produce it at the output. The output vectors can be scalars if the size of the output vectors is equal to unity.

A first summer 136 adds the value Va received at the input via the connection 135 to the value from a third memory 137 received at the input via the connection 138. The memory comprises a value equal to 0.5. The output of the first summer 136 is connected to a first saturation means 140 via the connection 139.

A second summer 143 adds the value Vb received at the input via the connection 142 to the value from a fourth memory 144 received at the input via the connection 145. The memory comprises a value equal to 0.5. The output of the second summer 143 is connected to a second saturation means 148 via the connection 147.

A third summer 151 adds the value Vc received at the input via the connection 150 to the value from a fifth memory 152 received at the input via the connection 153. The memory comprises a value equal to 0.5. The output of the third summer 151 is connected to a third saturation means 156 via the connection 155.

The output of the first saturation means 140 carrying a duty cycle RCa, the output of the second saturation means 148 carrying a duty cycle RCb and the output of the third saturation means 156 carrying a duty cycle RCc are connected via connections (141, 149, 157) to a recomposition means 158, designed to generate a value RCabc starting from the values RCa, RCb and RCc. The recomposition means 158 is connected to the output 29.

Recomposition means is understood to mean a means designed to transform one or more vectors received at the input into a vector with a size greater than the size of the vectors received at the input and to produce it at the output. The input vectors can be scalars if the size of the input vectors is equal to unity.

Here, the value RCabc is generated by the recomposition means 158 starting from the three values RCa, RCb and RCc by scalar-vector conversion or by multiplexing.

Figure 8:
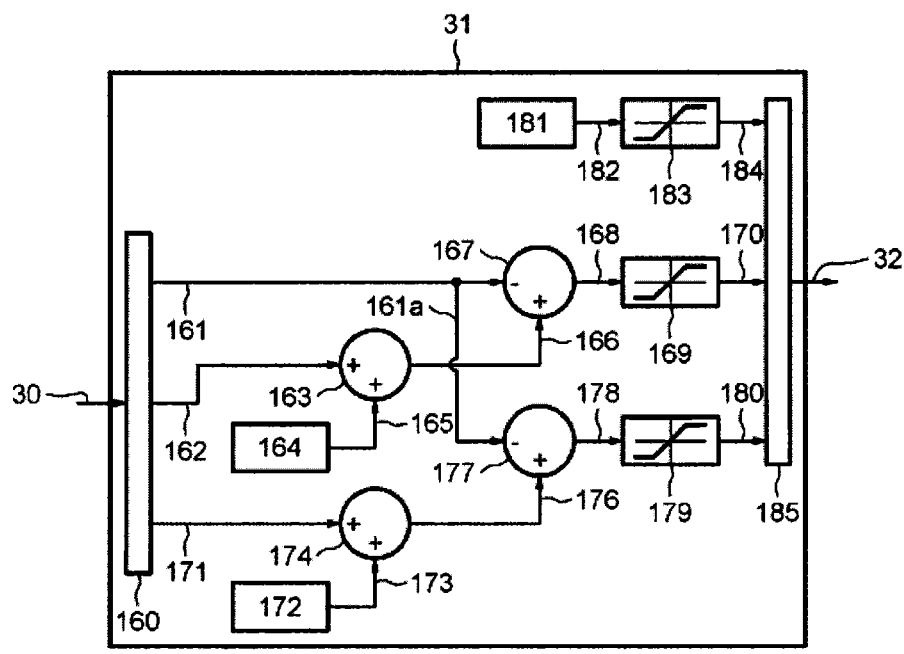
FIG. 8 illustrates the main elements of a means for holding at the DC potential.

FIG. 8 illustrates a means for holding at the DC potential 31 described hereinabove with reference to FIG. 3.

A means for holding at the DC potential 31 receives the value Vabc at its input via the connection 30 and produces the value RCabc at its output via the connection 32. The value Vabc is transformed by a decomposition means 160 into three values Va, Vb and Vc by vector-scalar conversion or by de-multiplexing.

A fourth summer 163 included in the means for holding at the DC potential 31 adds the value Vb received at the input via the connection 162 to the value equal to unity stored in a sixth memory 164 received at the input via the connection 165.

A fifth summer 174 adds the value Vc received at the input via the connection 171 to the value equal to unity stored in a seventh memory 172 received at the input via the connection 173.

A first subtractor 167 subtracts the value Va received at the input via the connection 161 from the value coming from the fourth summer 163 received via the connection 166. The output of the first subtractor 167 is connected to a fourth saturation means 169 via the connection 168. The fourth saturation means 169 produces a value RCb at its output via the connection 170.

A second subtractor 177 subtracts the value Va received at the input via the branch line 161a of the connection 161 from the value coming from the fifth summer 174 received via the connection 176. The output of the second subtractor 177 is connected to a fifth saturation means 179 via the connection 178. The fifth saturation means 179 produces a value RCc at its output via the connection 180.

An eighth memory 181 containing a value equal to unity is connected to a sixth saturation means 183 via the connection 182. The sixth saturation means 183 produces a value RCa at its output via the connection 184.

The fourth saturation means 169, the fifth saturation means 179 and the sixth saturation means 183 are respectively connected via the connections (170,180,184) to a recomposition means 185 designed to form a signal RCabc starting from values RCa, RCb and RCc.

The second means for holding at the DC potential 34 and the third means for holding at the DC potential 37 comprise the same means and the same connections as the first means for holding at the DC potential 31. However, the second means for holding at the DC potential 34 and third means for holding at the DC potential 37 differ from the first means for holding at the DC potential 31 in that the signals Va Vb and Vc carried by the connections (161,162,171) in the first means for holding at the DC potential 31 carry the signals Vb, Vc and Va in the second means for holding at the DC potential 34 and the signals Vc, Va and Vb in the third means for holding at the DC potential 37.

Similarly, the second and third means for holding at the DC potential differ from the first means for holding at the DC potential 31 in that the signals RCa, RCb and RCc carried by the connections (184, 170, 180) in the first means for holding at the DC potential 31 carry the signals RCb, RCc and RCa in the second means for holding at the DC potential 34 and the signals RCc, RCa and RCb in the third means for holding at the DC potential 37.

Figure 9:
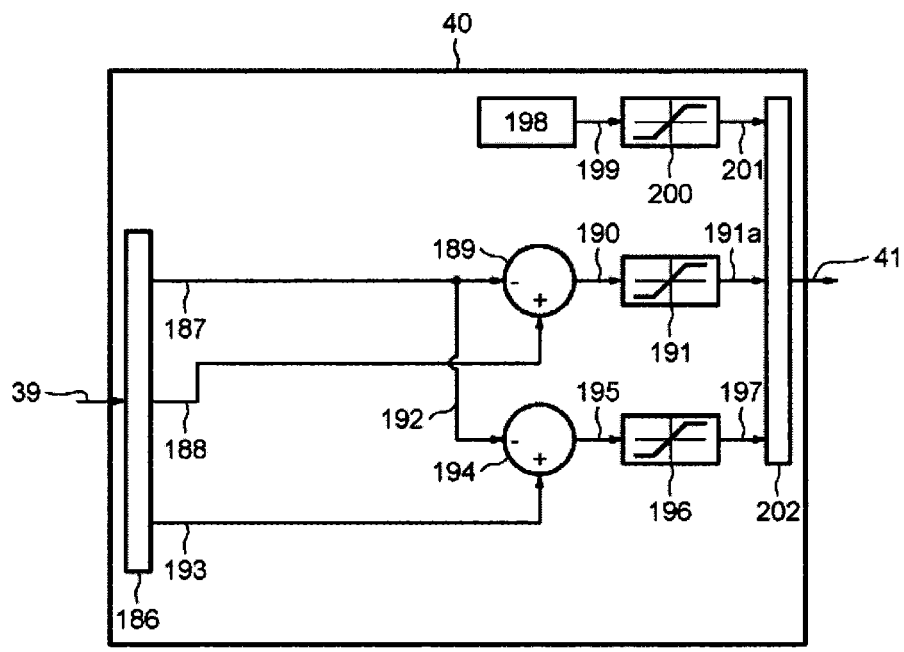
FIG. 9 illustrates the main elements of a means for holding at the zero potential.

FIG. 9 illustrates a means for holding at the zero potential. A first means for holding at the zero potential 40 receives the value Vabc at its input via the connection 39 and produces the value RCabc at its output via the connection 41. The value Vabc is transformed by a decomposition means 186 into three values Va, Vb and Vc by vector-scalar conversion or by de-multiplexing.

A third subtractor 189 subtracts the value Vc received from the connection 187 from the value Va received from the connection 188. The third subtractor 189 is connected at its output to a seventh saturation means 191 via the connection 190. The seventh saturation means 191 produces a value RCa at its output via the connection 191*a*. The fourth subtractor 194 subtracts the value Vc received from the branch line 192 of the connection 187 from the value Vb received from the connection 193. The fourth subtractor 194 is connected at its output to an eighth saturation means 196 via the connection 195. The eighth saturation means 196 produces a value RCb at its output via the connection 197. A ninth memory 198 containing a zero value is connected to a ninth saturation means 200 via the connection 199. The ninth saturation means 200 produces a value RCc at its output via the connection 201.

The various saturation means limit the amplitude of the signals received at the input to values in the range between zero and unity. In the case where these values are exceeded, clipping occurs.

The second means for holding at the zero potential and the third means for holding at the zero potential 46 comprise the same means and the same connections as the first means for holding at the zero potential 40. However, the second means for holding at the zero potential 43 and the third means for holding at the zero potential 46 differ from the first means for holding at the zero potential 40 in that the signals Va, Vb and Vc carried by the connections (188,193,187) in the first means for holding at the zero potential 40 carry the signals Vb, Vc and Va in the second means for holding at the zero potential 43 and the signals Vc, Va and Vb in the third means for holding at the zero potential 46. Similarly, the second means for holding at the zero potential 43 and the third means for holding at the zero potential 46 differ from the first means for holding at the zero potential 40 in that the signals RCa, RCb and RCc carried by the connections (191*a*,197,201) in the first means for holding at the zero potential 40 carry the signals RCb, RCc and RCa in the second means for holding at the zero potential 43 and the signals RCc, RCa and RCb in the third means for holding at the zero potential 46.

The control system allows the switching losses to be drastically reduced. It also allows a simple control only depending on the two thresholds for enabling the phase splicing. Finally, the control system takes into account the switching times and dead time of the transistors of the voltage inverter in order to limit the distortions of the voltages generated that supply the electric motor.

The method for controlling a voltage inverter, notably for supplying power to a multiphase electric motor of an automobile vehicle, comprises a step for generating values of power supply voltages for each phase of the electric motor, together with an amplitude value of the power supply voltages.

Duty cycles are determined that are generated as a function of the values of power supply voltages for each phase of the electric motor, and also of the amplitude value of the power supply voltages. Subsequently, a phase splicing is determined followed by a step for controlling the phase splicing. Finally, the duty cycles generated are sent to the voltage inverter.

The invention claimed is:

1. A system for controlling a voltage inverter, or supplying power to a multiphase electric motor of an automobile vehicle, comprising:
    a means for generating values of power supply voltages for each phase of the electric motor, together with an amplitude value of the power supply voltages;
    a phase-splicing determination means; and
    a means for controlling phase splicing cooperating together to control transmission to the voltage inverter of duty cycles generated by means for determining the duty cycles, as a function of the values of power supply voltages for each phase of the electric motor, and also of the amplitude value of the power supply voltages,
    in which the means for controlling the phase splicing is configured to generate a signal for enabling the phase splicing depending on a comparison of the amplitude value of the power supply voltages with a splicing enabling threshold and with a splicing disabling threshold.

2. A control system for controlling a voltage inverter, or supplying power to a multiphase electric motor of an automobile vehicle, comprising:
    a means for generating values of power supply voltages for each phase of the electric motor, together with an amplitude value of the power supply voltages;
    a phase-splicing determination means; and
    a means for controlling phase splicing cooperating together to control transmission to the voltage inverter of duty cycles generated by means for determining the duty cycles, as a function of the values of power supply voltages for each phase of the electric motor, and also of the amplitude value of the power supply voltages,
    in which the phase-splicing determination means comprises phase detection means each configured to generate a phase voltage signal, the phase-splicing determination means being further configured to generate a phase identification signal at the output equal to that of the phase voltage signals whose value is non-zero.

3. The control system as claimed in claim 2, in which the means for controlling the phase splicing is configured to generate a signal for enabling the phase splicing depending on a comparison of the amplitude value of the power supply voltages with a splicing enabling threshold and with a splicing disabling threshold.

4. The control system as claimed in claim 3, further comprising switches configured to control generation of a signal from amongst the duty cycle signals received from the means for determining the duty cycles for each phase depending on the signals received from the phase-splicing determination means and from the means for controlling the phase splicing.

5. The control system as claimed in claim 4, in which the means for determining the duty cycles for each phase comprises at least one means for holding at zero potential, configured to cancel the duty cycle of one phase by addition of a constant shift and to shift the duty cycles of other phases by a same constant.

6. The control system as claimed in claim 4, in which the means for determining the duty cycles for each phase comprises at least one means for holding at DC potential configured to fix the duty cycle of a phase at the value one by addition of a constant shift and to shift the duty cycles of other phases by a same constant.

7. The control system as claimed in claim 4, in which the means for determining the duty cycles for each phase comprises at least one scalar control means configured to shift all the duty cycles by addition of a same constant.

8. The control system as claimed in claim 7, in which the means for determining the duty cycles for each phase comprises as many means for holding at zero potential and as many means for holding at DC potential as there are phases of the multiphase electric motor.

9. A method for controlling a voltage inverter, or supplying power to a multiphase electric motor of an automobile vehicle, comprising:
    generating values of power supply voltages for each phase of the electric motor, together with an amplitude value of the power supply voltages;

determining duty cycles that are generated as a function of values of power supply voltages for each phase of the electric motor, and also of the amplitude value of the power supply voltages;
determining a phase splicing; and
generating a phase splicing command to control transmission of the duty cycles generated to the voltage inverter, including generating a signal for enabling the phase splicing depending on a comparison of the amplitude value of the power supply voltages with a splicing enabling threshold and with a splicing disabling threshold.

* * * * *